H. Baughman.
Corn Planter.

No. 94,546.        Patented Sep. 7, 1869.

Witnesses:
C. A. Pettit
G. C. Kemon

Inventor:
H. Baughman
by Mumm & Co.
Attorneys.

United States Patent Office.

HENRY BAUGHMAN, OF COLUMBUS, OHIO.

Letters Patent No. 94,546, dated September 7, 1869.

IMPROVEMENT IN CORN-PLANTERS.

The Schedule referred to in these Letters Patent and making part of the same.

*To all whom it may concern:*

Be it known that I, HENRY BAUGHMAN, of Columbus, in the county of Franklin, and State of Ohio, have invented a new and improved Corn-Planter; and I do hereby declare that the following is a full, clear, and exact description of the construction and operation of the same, reference being had to the accompanying drawings, making a part of this specification, in which—

Figure 1:
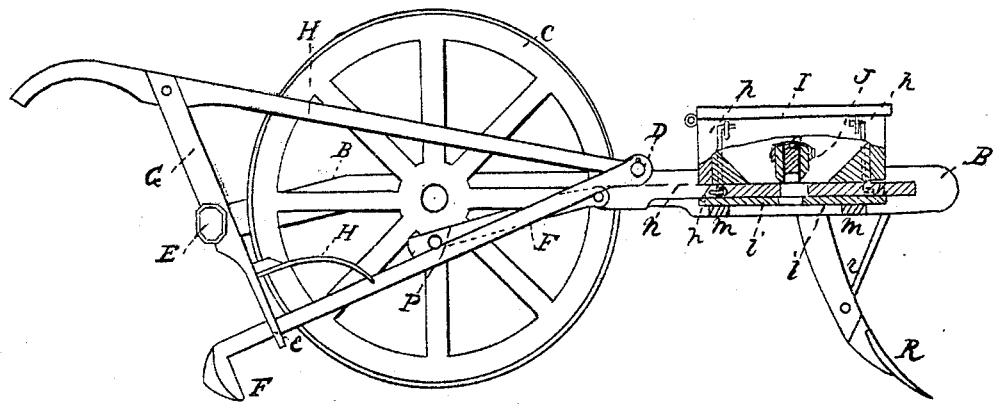
Figure 1 is a side view, a portion of the seed-box being shown in section.
Figure 2:
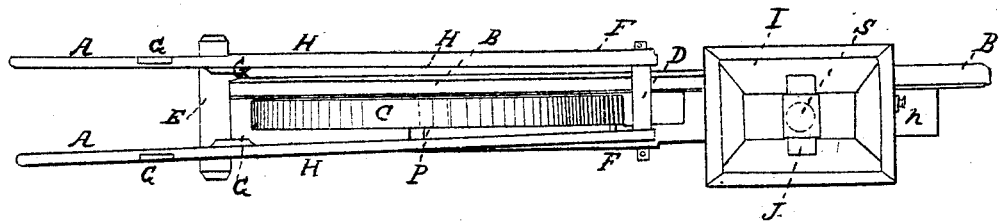
Figure 2 is a top view.

The object of this invention is to provide for public use a simple and convenient corn-planter, which can be worked by hand or other power. To this end, The invention consists of an improved apparatus for clearing the distributing slide, and an improved general arrangement of the various devices constituting the whole machine, as hereinafter described.

In the drawings—

A A represent the handles;

B, the beam; and

C, the wheel.

D is a short cross-bar, attached to the beam in front of the wheel, and

E is another attached to the rear end of the beam.

Connected by sweeps or drag-bars F F, to the ends of cross-bar D, are two covering scrapers F′ F′.

G G are two inclined standards, attached to the ends or near the ends of the cross-bar E, and supporting the upper extremity of the handles.

Their lower ends extend down nearly to the ground, and are slotted, as seen at $e$, forming guides, through which pass the drag-bars F F.

H H are springs, to press the scrapers F′ down to the ground with sufficient force, thus obviating the necessity for heavy cast-iron scrapers.

$m$ $m$ are arms, projecting from the right-hand side of beam B, and serving to support the bottom $i$ of the seed-box I, the top and sides of said box being attached to it by means of hasps and staples $h$ $h$, so that by unlatching the hasps, the upper part of the seed-box can be detached and removed.

Across the middle of the seed-box is a bridge, J, under which is a hole, through the bottom $i$, to allow the seed to drop through to the ground.

$n$ is a reciprocating slide, arranged longitudinally with the box, so as to slide back and forth under the bridge J, and over the hole in floor $i$.

It is itself provided with a hole, which alternately opens and closes the hole in floor $i$, thus dropping the seed properly to the ground.

The slide $n$ is operated by a pitman, P′, worked by a crank on the shaft of wheel C, or the equivalent thereof.

R is a plow or cultivator tooth, attached to beam B, near the front end of box I, and supported by a brace, $r$.

In order to properly clear the slide $n$, and at the same time to prevent the corn in the seed-pocket from being crushed and broken, I cut out an arch in the centre of the bridge J, over the hole in floor $i$. I then arrange two vertical slides or scrapers, $o$ $o$, in the sides of the bridge, so as to cover the ends of the arch and press down upon the slide $n$, as it plays back and forth.

A piece of rubber, $s$, is fastened over the upper edge of the bridge, over the ends of the two scrapers $o$ $o$, in such a manner as to press them down and cause them to keep in contact with slide $n$, so as to sever communication between the seed-pocket and the chamber of the seed-box, when the pocket is under the bridge. At the same time, if a kernel of corn gets wedged under the edge of the scrapers they will not crush it, but the spring $s$ will allow them to rise over it, and will bring them down again when it has passed.

Having thus described my invention,

What I claim as new, and desire to secure by Letters Patent, is—

The construction and arrangement of the handles A A, beam B, wheel C, cross-bars D E, drag-bars F F, scrapers F′ F′, standards G G, and springs H H, in connection with a seed-box I, slide $n$, and plow R, substantially as shown and described.

To the above specification of my invention, I have signed my name, this 12th day of July, 1869.

HENRY BAUGHMAN.

Witnesses:
CHAS. A. PETTIT,
SOLON C. KEMON.